United States Patent
Lazzara et al.

(10) Patent No.: US 7,117,885 B2
(45) Date of Patent: Oct. 10, 2006

(54) RESET RELIEF VALVE

(75) Inventors: Gerard S. Lazzara, Houston, TX (US); Ernest F. Cox, Tomball, TX (US)

(73) Assignee: RR Valve, Inc., Houston, TX (US)

( * ) Notice: Subject to any disclaimer, the term of this patent is extended or adjusted under 35 U.S.C. 154(b) by 371 days.

(21) Appl. No.: 10/773,972

(22) Filed: Feb. 6, 2004

(65) Prior Publication Data

US 2004/0168725 A1    Sep. 2, 2004

Related U.S. Application Data

(60) Provisional application No. 60/445,690, filed on Feb. 7, 2003, provisional application No. 60/467,640, filed on May 3, 2003.

(51) Int. Cl.
F16K 17/00    (2006.01)
F16K 21/10    (2006.01)

(52) U.S. Cl. .................. 137/467; 137/514.5; 251/54

(58) Field of Classification Search ............... 137/467, 137/514.5; 251/54
See application file for complete search history.

(56) References Cited

U.S. PATENT DOCUMENTS 2,552,479 A * 5/1951 Copping .................. 251/54
2,973,776 A * 3/1961 Allen ...................... 137/467
2,973,777 A * 3/1961 Troxell, Jr. ............... 137/467
2,984,254 A * 5/1961 Allen ...................... 137/467
3,315,701 A * 4/1967 Stilwell .................... 251/54
3,698,424 A * 10/1972 Wiegand .................. 137/467
3,730,215 A * 5/1973 Conery et al. ............. 251/54
3,732,889 A * 5/1973 Conery et al. ............. 251/54
4,469,125 A * 9/1984 Keeney .................... 137/467
5,351,714 A * 10/1994 Barnowski ................ 137/467
5,715,861 A * 2/1998 Williams .................. 137/467

* cited by examiner

*Primary Examiner*—John Rivell

(57) ABSTRACT

A reset relief valve with a body having an inlet port, an outlet port, and an interior wall partially defining an enclosed chamber, a piston disposed in the body and moveable between a first position at which the piston is disposed in fluid flow-blocking relationship between the inlet port and the outlet port of the body and a second position at which the piston is removed from that position, a piston having a head with opposed end surfaces one of which defines a portion of the enclosed chamber and at least one fluid flow passageway extending through the head and providing fluid communication between the enclosed chamber in the body, and a second chamber above a moveable disc in the piston. A preferred embodiment includes the crank assembly with cross bar support and a T-bar to prevent downward movement of the disc.

15 Claims, 6 Drawing Sheets

RESET RELIEF VALVE

CROSS REFERENCE TO RELATED APPLICATIONS

This application is based on provisional application Ser. No. 60/445,690, filed on Feb. 7, 2003 and provisional application Ser. No. 60/467,640 filed May 3, 2003.

STATEMENT REGARDING FEDERALLY SPONSORED RESEARCH OR DEVELOPMENT

Not Applicable
DESCRIPTION OF ATTACHED APPENDIX
Not Applicable

BACKGROUND OF THE INVENTION

This invention relates generally to the field of pressure relief valves and more specifically to a reset relief valve.

Pressure relief valves are important components in certain fluid flow systems in which undesirable high pressure may occur. In such systems, overpressure can damage valuable processing equipment or cause breakdown or rupture of weak components of the system. It is desirable that when a pre-determined or pre-designated threshold pressure is exceeded, the pressure relief valve open very quickly, i.e., virtually instantaneously, to relieve system pressure. Pressure relief valves having this capability are commonly referred to as "pop-off" valves because of their rapid opening action. In carrying out the rapid opening of the valve, movable port-blocking elements within the valve, such as a plug or piston, are subjected to high acceleration and velocity, resulting in severe impact forces being imposed on the piston and other elements of the valve when the moving member reached its limit of travel away from the port-blocking position.

In prior art, the working fluid has been used to lessen impact within a valve by routing the fluid through ports or apertures in a manner to reduce impact forces. For example, U.S. Pat. No. 5,715,861 to Williams shows a fluid flow path whereby the subject fluid flows above the piston to equalize pressure. Fluid hydraulics using the pumped or working fluid have not proven to be effective in that high impact forces often tear internal parts upon initial activation of the valve. In other solutions, cushion members formed of rubber and similar resilient elastomeric materials have been used to attenuate the impact of the flow control piston subsequent to its rapid displacement from the flow-blocking position. Examples of such valves and rubber cushion members are disclosed in U.S. Pat. Nos. 2,973,776 and 2,973,777 respectively issued on Mar. 7, 1961 to Herbert Allen and John N. Troxell, Jr. While the annular elastomeric cushion rings do provide effective initial shock attenuation, the rings, aided by the initial drop in pressure at the inlet port when the piston is moved from its blocking position, promote undesirable rebounding of the piston, which inhibits the free flow of fluid to the outlet port, and impose additional repetitive shock forces on the entire valve assembly. Furthermore, the rebounding action attributed to the resilient rings often resulted in the relief valve resetting itself before release of the excess pressure, only to be triggered soon thereafter by the unrelieved pressure. This opening and unintended resetting cycle could continue for a significant period of time until it was detected, and was a major contributor to wear and failure of the internal linkage mechanism and other components of the valve.

The various solutions in the prior art fail to provide a relief valve that can be manually reset after activation and that withstands the pressures commonly found in their application thereby avoiding damaging impacts on the valve and the need to replace the valve after it is activated.

BRIEF SUMMARY OF THE INVENTION

The primary advantage of the invention is to provide a pressure relief valve that is re-setable after being activated.

Another advantage of the invention is to provide a relief valve that utilizes hydraulic pressure to dampen activation.

Another advantage of the invention is to provide a relief valve that provides a rapid flow path upon activation.

A further advantage of the invention is to provide a relief valve that has a strengthened crank assembly to withstand high pressures.

Yet another advantage of the invention is to provide an improved piston for withstanding impact forces upon activation.

Other advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a reset relief valve having a body with an inlet port, an outlet port, and an interior wall partially defining an enclosed chamber, a piston disposed in the body and moveable between a first position at which the piston is disposed in fluid flow-blocking relationship between the inlet port and the outlet port of the body and a second position at which the piston is removed from fluid flow-blocking position, the piston having a head which partially defines a first chamber and at least one flow passageway extending between the chamber in the body and a second chamber having a lower surface defined in part by a disc disposed in a hollow portion of the piston head, a bonnet attached to the body, a stem bushing disposed in the bonnet in spaced relationship with the head of the piston, the stem bushing having a surface defining another portion of the first chamber and an internal bore in which the stem is slidably supported, at least one spring and at least two pivotally interconnected link members operatively disposed between the spring and the stem, and a crank assembly for selectively engaging the pivotally interconnected link members for urging the piston into the first position.

In accordance with a preferred embodiment of the invention, there is disclosed a reset relief valve with a body having an inlet port, an outlet port, and an interior wall partially defining an enclosed chamber, a partially hollowed out piston disposed in said body and moveable between a first position at which the piston is disposed in fluid flow-blocking relationship between the inlet port and the outlet port of the body and a second position at which the piston is removed from the fluid flow-blocking position, piston having a head with opposed surfaces one of which defines a first chamber and at least one fluid flow passageway extending through the head and providing fluid communication between the first chamber in said body and a second chamber having a lower surface defined by an inner piston disposed in a hollow portion of the piston head, a bonnet attached to the body, a stem bushing disposed in the bonnet in spaced relationship with the head of the piston, the stem bushing having a surface defining another portion of the enclosed chamber and an internal bore in which the stem is slidably supported, crank assembly for urging the piston into the first position.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
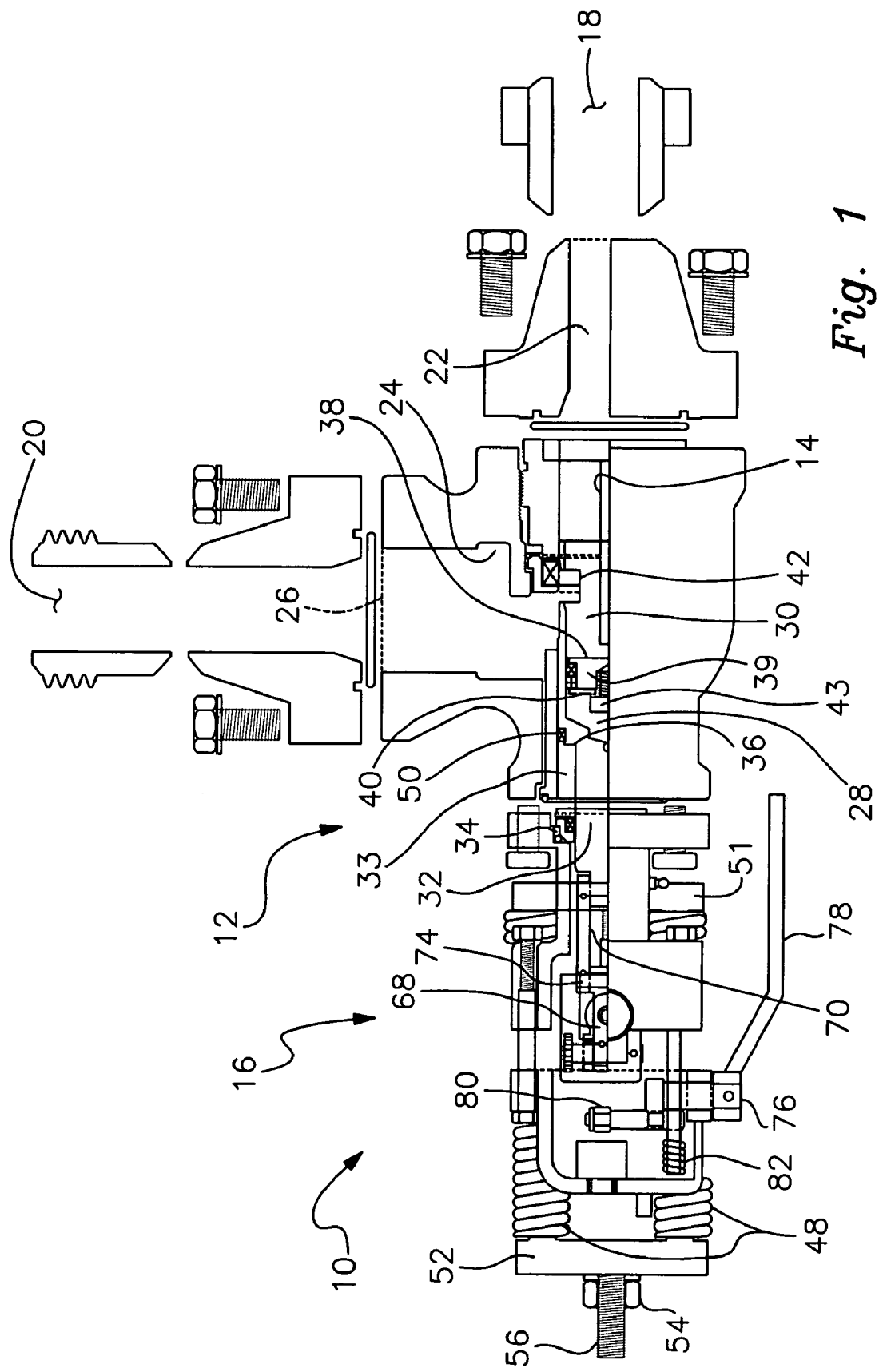
FIG. 1 is a partially exploded cross sectional view of a preferred embodiment of the invention.

Turning now to FIG. 1, there is shown a partially exploded cross sectional view of the reset valve of the present invention. In the preferred embodiment of the present invention, shown in FIGS. 1–4, a pressure relief valve 10 has a body 12, a piston 14 movably disposed within the body 12, and a bonnet assembly 16. FIGS. 1–4 are shown in a horizontal orientation relative to the typical assembled vertical field position. References herein to an upward or downward movement or upper and lower positions refer to an orientation where bonnet assembly 16 is positioned above piston 14 in a vertical orientation. The relief valve 10 is typically connected to a line conduit 18 in fluid communication with a fluid system containing a fluid under pressure, and a discharge conduit 20 in fluid communication with a fluid containment or storage structure, sump, drain line, or other arrangement for receiving fluid relieved from the fluid system.

The valve body 12 has an inlet port 22 that is adapted to receive the line conduit 18, and an internally disposed annular chamber 24 in fluid communication with an outlet port 26 that is adapted to receive the discharge conduit 20. The body 12 also has an internal bore providing an interior cylindrical wall surface that partially defines enclosed chambers 28 and 33, the features and function of which are disclosed below in more detail.

Figure 2:
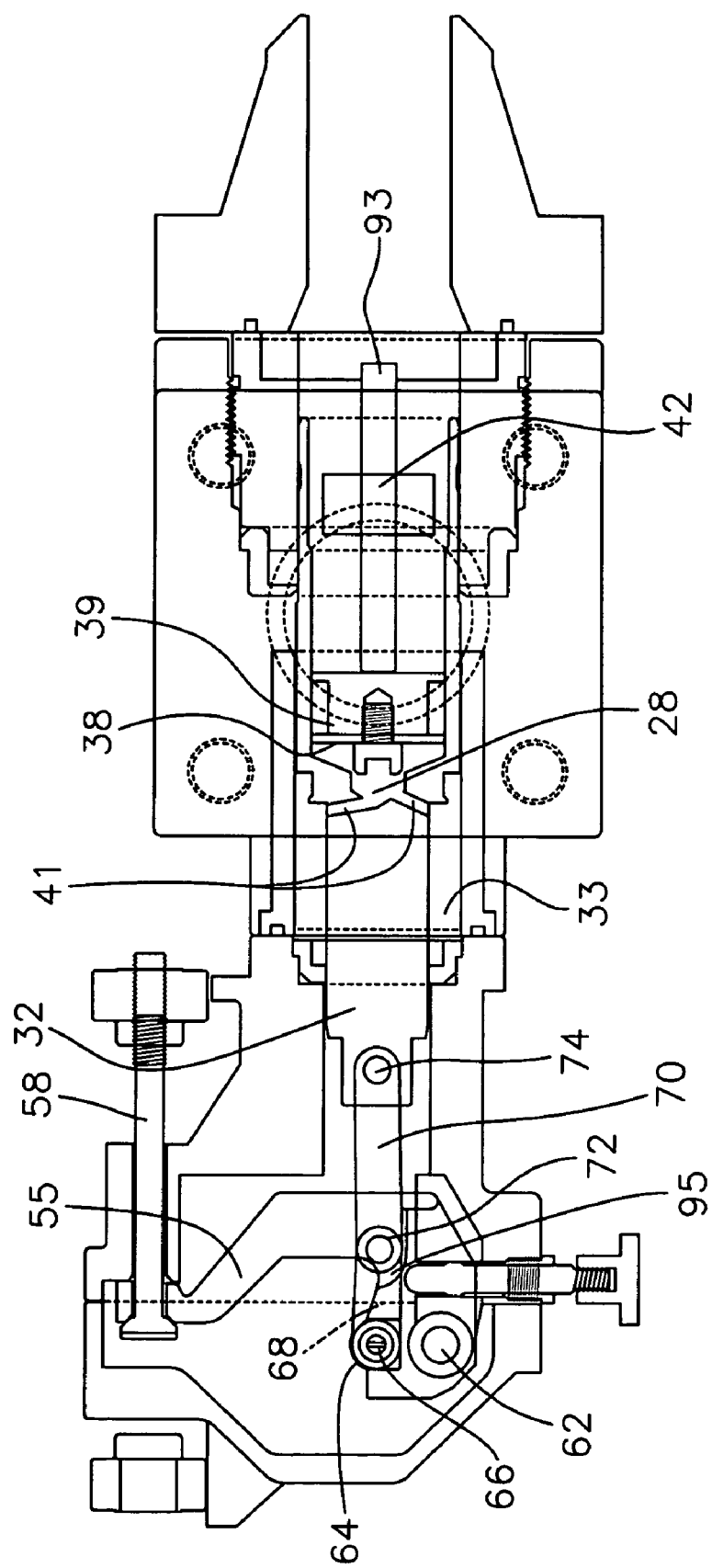
FIG. 2 is a plan view of a preferred embodiment of the invention with the valve set in the unactivated position.

Piston 14 has a partially hollow head 30 and an elongated stem 32 extending outwardly from head 30. A stem bushing 34 is mounted in the bonnet assembly 16 such that the bottom surface of the bushing 34 is spaced from the piston head 14 when the piston 14 is at a first, or set, position as shown in FIGS. 1 and 2.

Disposed in a cylindrical cavity in said piston head 30 is a cylindrical inner piston 39 having a piston cap 40. Inner piston 39 is a round disc that freely moves in sealed engagement within said cavity of said piston. Inner piston 39 has at its upper portion piston cap 40 attached with cap screw 43. Inner piston 39 is freely moveable within said cavity in piston head 30 and the upper surface of piston cap 40 defines the lower portion of lower enclosed chamber 28. At the first position, the head 30 and inner piston 39 block the flow of fluid between the inlet port 22 and the outlet port 26. The head has an annular upper surface 36 that defines, in part, a lower wall of upper enclosed chamber 33. When piston head 14 is at its first, or set position, the lower portion of inner piston 39 is in fluid contact with the inlet conduit. Piston head 30 also has an exhaust port 42 which is shown as a rectangular cut-out portion of the piston head.

Figure 3:
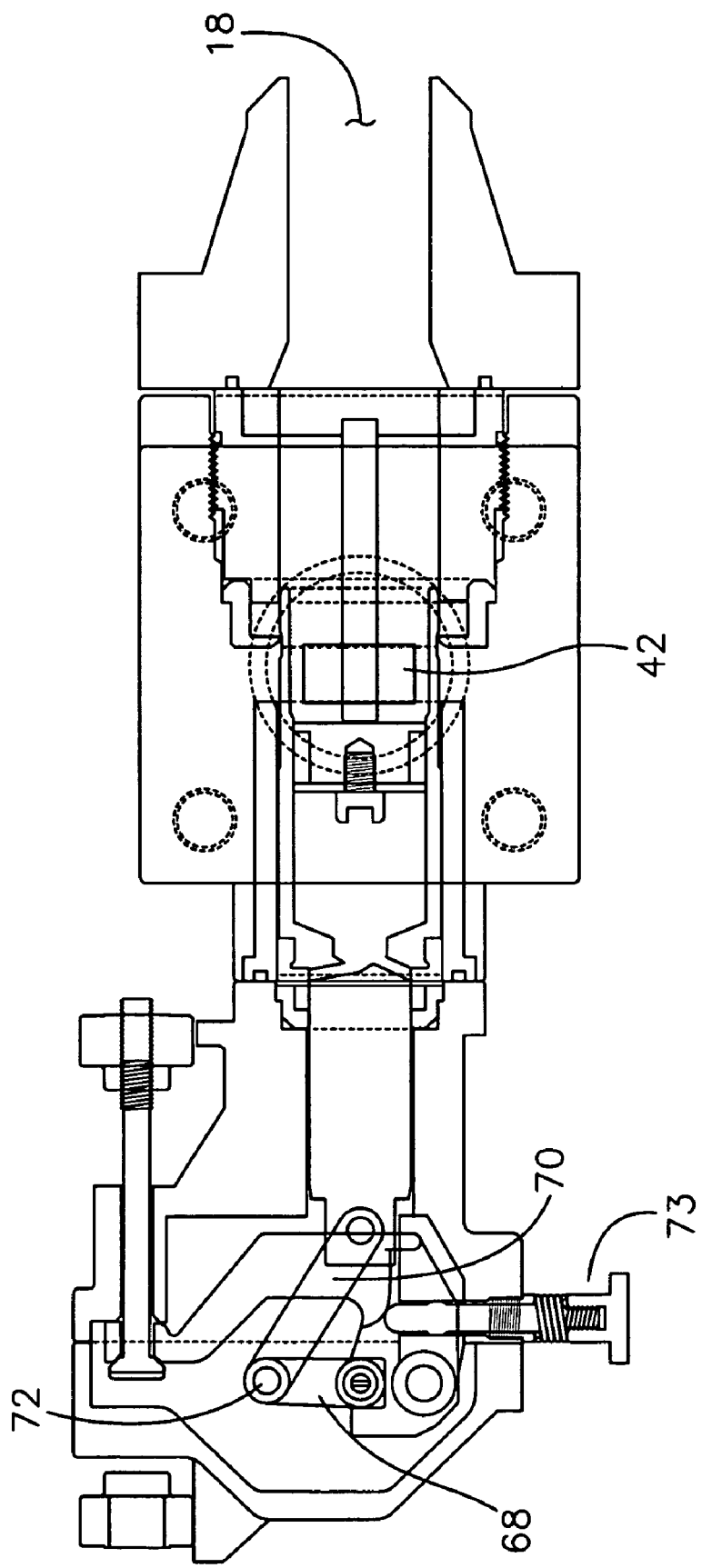
FIG. 3 is a plan view of a preferred embodiment of the invention with the valve set in the open or activated position.

Importantly, the piston 14 has one or more apertures 41 (shown in FIGS. 2 and 5A) that extend through the upper portion of head 30 of the piston 14 providing a hydraulic fluid flow path between lower enclosed chamber 28 and upper enclosed chamber 33. The key function of the apertures 41 is to provide a controlled flow path for hydraulic fluid to pass between upper and lower chambers 28 and 33 when the piston 14 is at its first and second positions. Chambers 28 and 33 may be filled with any variety of fluids, including, among others, oil, anti-freeze, water, or lubrication grease. In addition, in certain applications, said chambers may be filled with other materials including gases or air. Said chambers are sealed off from the working fluid by the arrangement of the piston head, disc and piston chamber. This controlled hydraulic fluid path between chambers 28 and 33 cushion the compressive force of the piston 14 when it is moved from its above-described first position to a second, or relief, position at which the piston head 30 is moved from its flow blocking position between the inlet and outlet ports, 22 and 26. As can be seen in FIGS. 1 and 3, when piston 14 is raised to the second position, there is essentially no impediment to fluid flow between the line conduit 18, which typically contains pressurized fluid, and the discharge conduit 20 which is typically open to atmosphere, or ambient pressure through exhaust port 42.

In an illustrative example, the pressure relief valve 10 is installed in a system for pumping drilling mud composed of water, clay and chemical additives, down through the inside of a drill pipe of an oil well drilling operation. The drilling mud is pumped at very high pressure, for example up to 7,500 psi (51,675 kPa), so that the mud is forced out through a bit at the lower end of the drill pipe and returned to the surface, carrying rock cuttings from the well. In this illustrative example, the lower surface 38 of the inner piston head 39 has a surface area substantially equal to the inner diameter of piston head 30 and piston head 30 has an outer diameter that is substantially equal to that of the cross-sectional area of the inlet port 22. The piston stem 32 has a diameter of about 1.625 in (4.13 cm), thus reducing the surface area of the upper surface 36 of the piston head 30 to an area less than the area of surface 38.

In normal operation, with the line, or system pressure at a pressure less than the predetermined value at which it is desired to relieve system pressure, the piston 14 is at its first position. At this position, fluid will flow from the inlet port 22, and stop at the bottom surface of inner piston 39, until there is essentially equal pressure on inner piston 39 and in turn within enclosed chambers 28 and 33. Exhaust port 42 is positioned so that it does not permit working fluid flow when the valve is in its first position to enter annular chamber 24. However, when the line pressure exceeds the predetermined value, typically as an almost instantaneous pressure spike resulting from line blockage, the valve 10 will trip in the manner described below, rapidly raising the piston head 30 away from its first position. Initially, the piston 14 will raise very rapidly, thereby decreasing the volume of the enclosed chamber 33, until the pressure in the enclosed chamber 33 is greater than the pressure of the fluid at surface 38 of the inner piston 39. As the head 30 continues to move upwardly toward the stem bushing 34, the volume of the enclosed chamber 33 decreases and, since the hydraulic fluid oil of this example is essentially a noncompressible fluid, the rate of upward movement of the piston 14 is restricted by the rate at which hydraulic fluid can be moved from the enclosed chamber 33, through the apertures 41 into enclosed chamber 28. Inner piston 39 moves upward slightly as the piston moves into its second position. Thus, the impact of the piston head 30 against the stem bushing 34, at the upward limit of travel of the head 30 is cushioned, and no rebound forces are imposed on the piston head 30 that would cause it move toward the closed position. Depending upon the viscosity of the hydraulic fluid placed in chambers 28 and 33, both the number and diameter of the apertures may vary and can be readily determined by one of ordinary skill in the art of fluid mechanics. In the above-described illustrative application in which oil is the hydraulic fluid, two apertures 41, each having a diameter of about 0.1875 in (0.476 cm), are equidistantly radially spaced from each other around the longitudinal centerline of the piston head 30, one at an angle relative to ground of 10 degrees and the other at an angle relative to ground of 25 degrees. Alternatively, the apertures 41 could be formed by drilling the desired diameter orifice through replaceable plugs that could be selectively inserted into the piston head 30. Such an arrangement would provide appropriately sized apertures for varying fluid viscosity applications, even allowing some of the plugs to have a solid construction if fewer apertures were required.

The pressure relief valve 10 embodying the present invention also has a first means for urging the piston into the above-described first position illustrated in FIGS. 1 and 2. With reference to FIG. 1, the first means includes a pair of load springs 48 that are controllably compressed between upper and lower spring retainers 50 and 52. The upper retainer 52 is adjustably mounted on the bonnet assembly 16 by an adjustable nut 54 threadably secured to an adjusting stud 56. With reference to FIG. 2, the lower end of a load screw 58 is secured to the lower retainer 50 and has an enlarged head at its upper end that fits into a mating socket provided at one end of a pivot crank member 55 and, as a result of the downward force applied by the compression springs 48 on the lower spring retainer 52, urges the socket end of the pivot crank 55 in a downward direction. The pivot crank member 55 is pivotally mounted on a crank pivot pin 62. The second end of the crank member 55 biasedly engages the outer ends of two spiral springs 64 that are concentrically mounted on a top crank pin 66 that is rotatably mounted in the second end of the pivot crank 55. The inner ends of the two spiral springs 64 are secured to the top crank pin 66, such that a small bias force acting in a counterclockwise direction as viewed in FIG. 2, is applied to the top crank pin 66. The upper end of an upper link 68 is attached to the top crank pin 66 and accordingly moves in concert with the pin 66 about its axis. The lower end of the upper link 68 is pivotally interconnected with the upper end of a lower link 70 by an upper link pin 72. The lower end of the lower link 70 is pivotally attached to an upper end of the piston stem 32 by a lower link pin 74. Lower link 70 is also positioned on the other side of the pin so that along its entire length is a uniform width which can be pressed against the crank. Lower link 70 is flattened and its planar surface has the shape of an oval with two opposing parallel sides and two opposing substantially rounded ends. This construction provides added strength to the linkage and permits proper engagement with the crank as more fully described below.

FIG. 2 shows a plan view of the invention with the reset valve set in the closed or inactivated position. In this position the fluid flow is prevented due to the presence of the piston and inner piston being in a position that blocks the flow of fluid from the input port to the output port.

When the valve 10 is in its operatively set position, with the piston head 30 at the first, or flow-blocking position, the upper and lower links 68 and 70 are vertically aligned thereby forming an essentially rigid line such that the compression force of the springs 48 is transferred through the load screw 58 to the pivot crank 55, thence through the top crank pin 66 to the aligned upper and lower links 68 and 70 and then to the upper end of the piston stem 32. If the pressure against the lower surface 38 of the inner piston 39 increases to a value greater than the compressive force applied to the upper end of the piston stem 32 by the load springs 48, the second end of the pivot crank 55 will be forced to rotate in a clockwise direction, as viewed in FIG. 3, causing the upper end of the upper link 68 to be moved out of alignment with the lower link pin 70. At this instant, the upper link pin 72 will immediately move leftwardly, causing the upper and lower links 68 and 70 to be moved out of vertical alignment, and thereby allowing the piston stem 32 to move upwardly. When the links 68 and 70 are moved out of alignment, the upward movement of the piston 14 is, as described above, impeded only by the flow of fluid from the enclosed chamber 28 through the apertures, or orifices, 41 into the enclosed chamber 33. Reset stem 73 may be used to facilitate manually moving the valve into an open position when not under pressure or tripping the valve when under pressure. As can be readily seen, line or working fluid is quickly expelled through exhaust port 42 facilitating the rapid flow of line fluid to the discharge conduit. The size and shape of exhaust port 42 may be of any a variety of configurations including an ellipse, oval, square or other opening shape. So long as the port is positioned so that no working fluid may pass when the valve is in the first position and upon activation is moved into a position to permit fluid flow, exhaust port 42 performs in the desired manner.

Because the upward movement of the piston 14 is hydraulically cushioned, there are no rebound, or "bounce" forces imposed on the piston 14, and accordingly the piston will not undesirably reset itself. The valve 10 embodying the present invention provides a second means for resetting the valve, i.e., for engaging the first means for urging the piston 14 into the first position. The second means includes a reset crank 76 that is rotatably mounted in the bonnet 16, and has a handle 78 at one end extending externally of the bonnet assembly 16 and a roller 80 at a second end disposed within the bonnet 16. The reset crank 76 is biased by a reset lower spring 82 whereby the roller 80 at the second end of reset crank 76 is maintained in a spaced, or clearance, position from the upper link 68, even when the upper link 68 is displaced from vertical alignment with the lower link 70, i.e., when the piston 14 is at the second position.

To reset the valve 10, pressure must be relieved from the inlet port 22, whereupon the reset handle 78 can be manually rotated counterclockwise to the rightward position shown in FIG. 2. This manual movement of the reset handle will cause the roller 80 to move the upper link 68 back into vertical alignment with the lower link 70.

Figure 4:
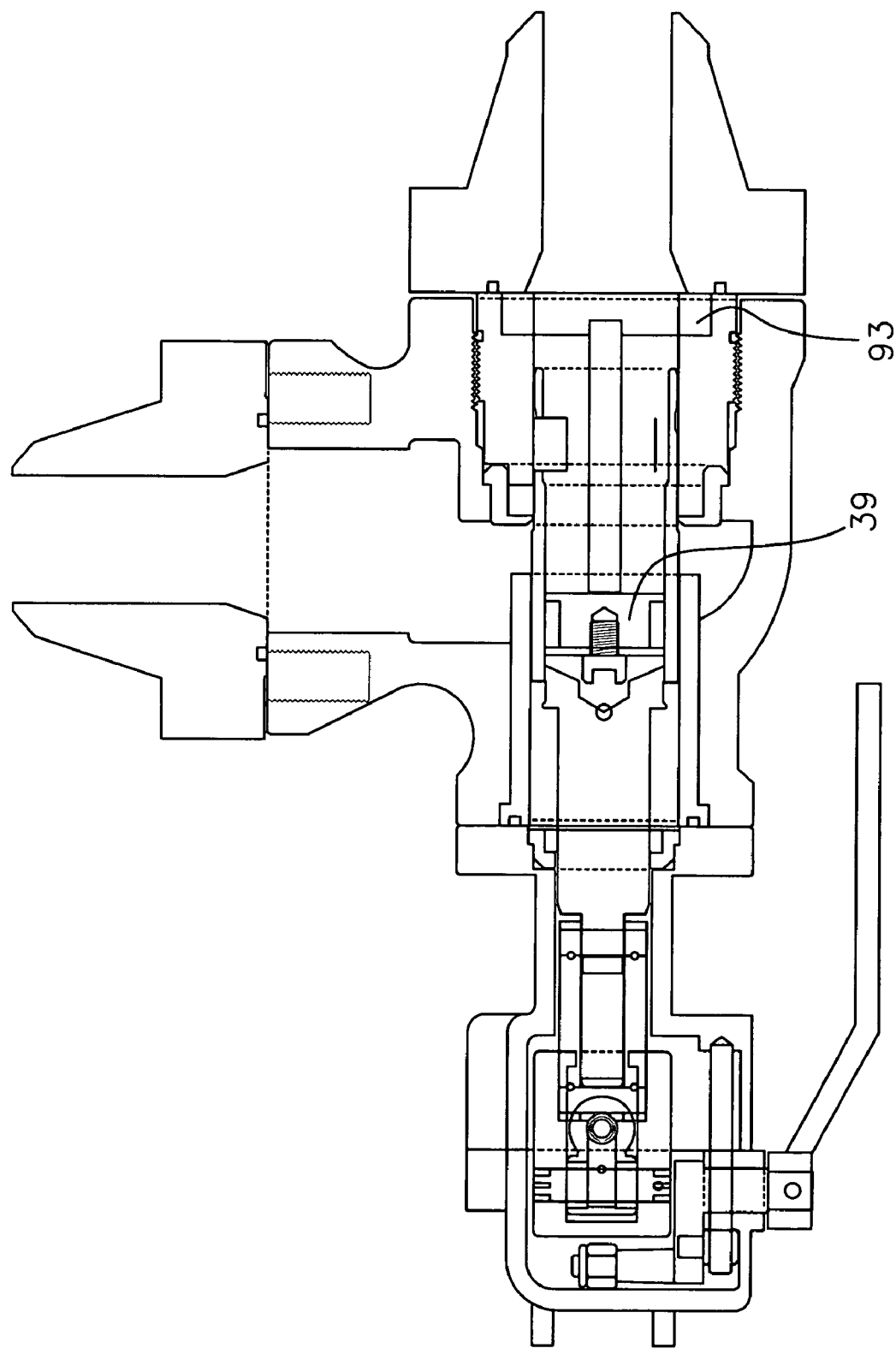
FIG. 4 is an elevational view of a preferred embodiment of the invention

FIG. 4 shows an additional side view of the reset valve in accordance with the present invention. Inner piston 39 is impeded in its downward movement by T-bar 93 composed of a horizontal member with an opening and a longitudinal bar affixed to said horizontal member. T-bar 93 is positioned to prevent inner piston 39 from moving too far toward inlet port 22 and potentially out conduit 18. T-bar 93 may be designed in any number of configurations that inhibit downward movement of inner piston 39 to fit the circumstances present. In some applications, T-bar 93 may be unnecessary altogether.

Figure 5A:
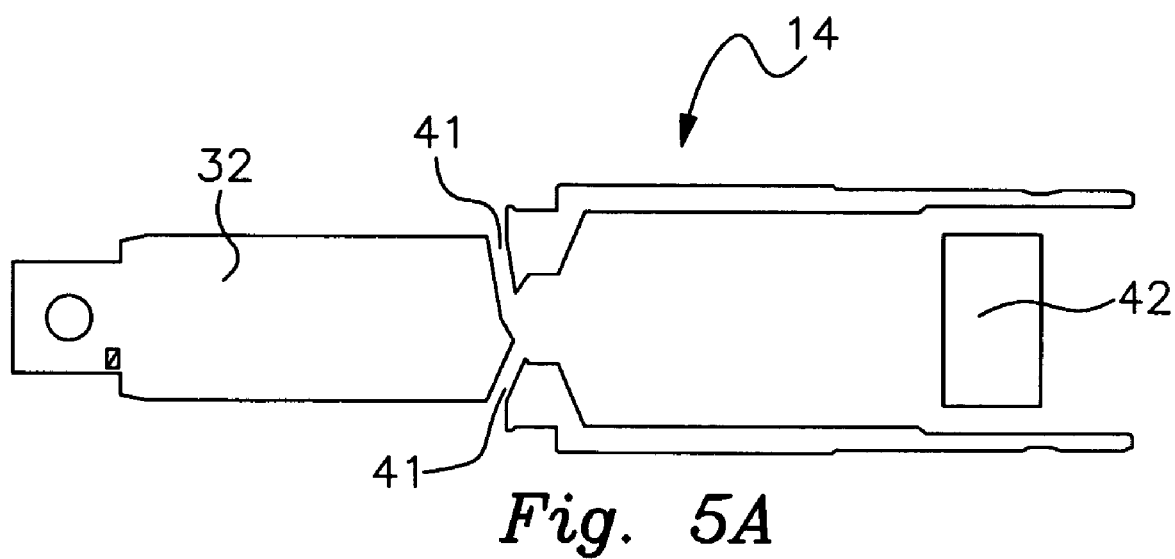
FIG. 5A is a cross sectional plan view of the piston used in a preferred embodiment of the invention.
Figure 5B:
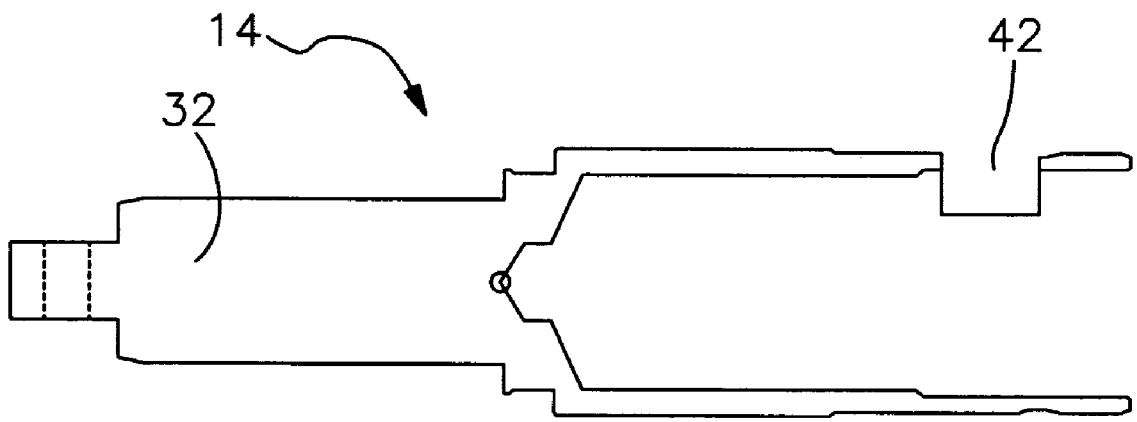
FIG. 5B is a cross sectional elevation view of the piston used in a preferred embodiment of the invention.

FIGS. 5A and 5B show piston 14 in plan and elevational views. FIG. 5A shows two fluid flow apertures 41 previously described. Exhaust port 42 is positioned on the side wall of piston head 30 to permit rapid fluid flow of discharge fluid upon activation of the valve. As previously noted, the size and location of exhaust port 42 may be varied depending on the fluid mechanics of the subject fluid and in some cases may be omitted altogether depending on the forces present and the need for rapid evacuation of fluid.

Figure 6C:
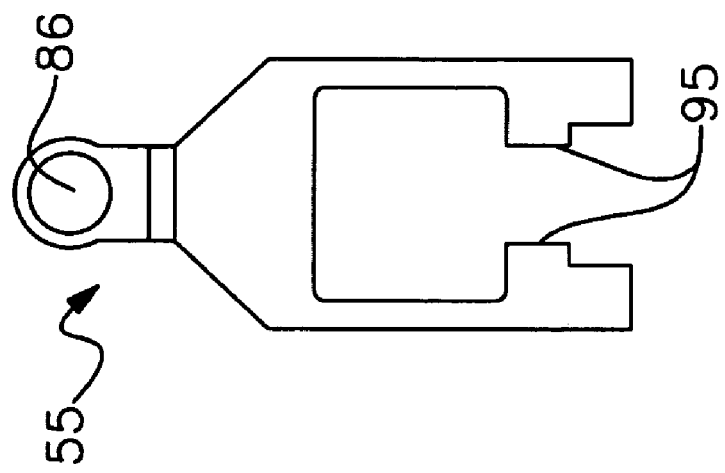
FIG. 6C is a side elevational view of the crank used in a preferred embodiment of the invention
Figure 6B:
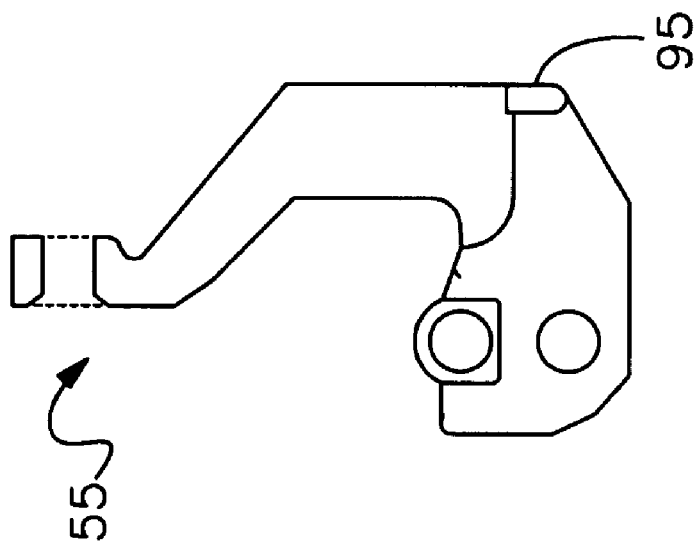
FIG. 6B is a bottom plan view of the crank used in a preferred embodiment of the invention.
Figure 6A:
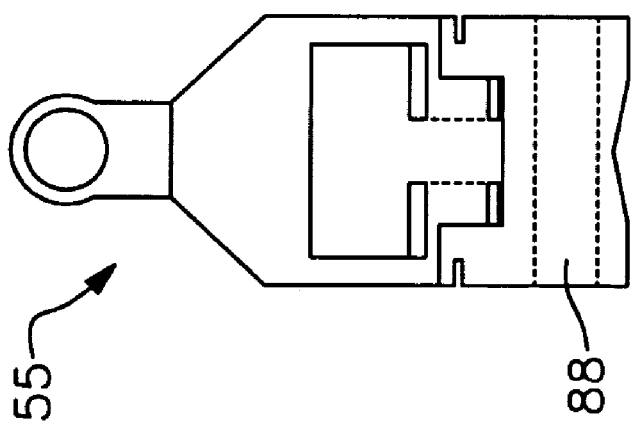
FIG. 6A is a top plan view of the crank used in a preferred embodiment of the invention.

FIGS. 6A, 6B, and 6C show crank 55. Load bearing bolt 58 goes through socket 86 and provides mechanical connection between crank 55 and the load bearing springs as previously described. Crank 55 has a cross bar 88 that provides greater impact strength to the crank. At the back of crank 55, as seen in FIGS. 6B and 6C, there is tab or millstop 95 positioned on each side of the crank. Link 70 shown in FIG. 3, for example, is one of a pair of links that are positioned on opposite sides of crank 55 and each engage their respective tabs or millstops on crank 55 as described above. Tab or Millstop 95 of said crank 55 engages link 70 at pin 72 connecting the upper and lower links shown in FIG. 2. As pressure mounts on the crank caused by increasing line pressure on the piston, the linkages engage the tab or millstop and at the pre-determined force provided by the piston against the load bearing springs, the pin connecting the two linkages is nudged much like kicking someone in the back of the knee and the longitudinal arrangement of the two links is broken permitting the piston to move in an upward direction.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A reset relief valve comprising:
   a body having an inlet port, an outlet port, and an interior wall partially defining an enclosed chamber;
   a piston disposed in said body and moveable between a first position at which said piston is disposed in fluid flow-blocking relationship between said inlet port and said outlet port of the body and a second position at which said piston is removed from said fluid flow-blocking position;
   said piston having a head which partially defines a first chamber and at least one flow passageway extending between said chamber in said body and a second chamber having a lower surface defined in part by a disc disposed in a cavity in said piston head;
   a bonnet attached to said body;
   a stem bushing disposed in said bonnet in spaced relationship with the head of said piston, said stem bushing having a surface defining another portion of said first chamber and an internal bore in which said stem is slidably supported;
   at least one spring and at least two pivotally interconnected link members operatively disposed between said spring and said stem; and
   crank assembly for selectively engaging said pivotally interconnected link members for urging said piston into said first position.

2. A reset relief valve as claimed in claim 1 wherein said crank assembly includes at least one spring and at least two pivotally interconnected link members operatively disposed between said spring and said stem.

3. A reset relief valve as claimed in claim 1 wherein said crank assembly includes a release shaft extending through a wall of said bonnet and having one end disposed in biased abutting contact with one of said pivotally interconnected link members when said piston is at said first position.

4. A reset relief valve as claimed in claim 1 wherein said piston has at least one cylindrical fluid communication path between said area above said disc and said chamber above said piston.

5. A reset relief valve as claimed in claim 1 wherein said crank assembly has a crank composed of a first and second arm connected by a cross bar.

6. A reset relieve valve as claimed in claim 1 wherein said first and second chambers are filled with fluid.

7. A reset relief valve as claimed in claim 6 wherein said fluid is oil.

8. A reset relief valve as claimed in claim 1 further comprising a longitudinal member disposed at the bottom of said piston chamber to prevent downward movement of said disc.

9. A reset relief valve as claimed in claim 8 wherein said member is a T-shaped bar positioned along the longitudinal axis of the piston at the inlet port.

10. A reset relief valve comprising:
    a body having an inlet port, an outlet port, and an interior wall partially defining an enclosed chamber;
    a partially hollowed out piston disposed in said body and moveable between a first position at which said piston is disposed in fluid flow-blocking relationship between said inlet port and said outlet port of the body and a second position at which said piston is removed from said fluid flow-blocking position;
    piston having a head with opposed surfaces one of which defines a first chamber and at least one fluid flow passageway extending through said head and providing fluid communication between said first chamber in said body and a second chamber having a lower surface defined by an inner piston disposed in a hollow portion of said piston head;
    a bonnet attached to said body;
    a stem bushing disposed in said bonnet in spaced relationship with the head of said piston, said stem bushing having a surface defining another portion of said enclosed chamber and an internal bore in which said stem is slidably supported; and
    crank assembly for urging said piston into said first position.

11. A reset relief valve as claimed in claim 9 wherein said disc is comprised of a inner piston body attached to a cap.

12. A reset relief valve as claimed in claim 9 further comprising a longitudinal member in said enclosed chamber for preventing downward movement of said disc.

13. A reset relief valve as claimed in claim 9 wherein said crank assembly has at least one tab for engaging said pivotally interconnected link members at a link between said members.

14. A reset relief valve as claimed in claim 9 wherein said piston head has an opening through said hollow portion.

15. A reset relief valve as claimed in claim 9 wherein said crank assembly includes at least one spring and at least two pivotally interconnected upper and lower link members operatively disposed between said spring and said stem wherein said lower link is substantially oval along its planar surface.

* * * * *